US012559347B2

(12) United States Patent
Bhor et al.

(10) Patent No.: US 12,559,347 B2
(45) Date of Patent: Feb. 24, 2026

(54) NOTIFICATION DEVICE AND METHOD FOR ELEVATOR OPERATION MODE

(71) Applicant: Inventio AG, Hergiswil (CH)

(72) Inventors: Amit Bhor, Pune Maharashtra (IN); Narayan Sangale, Pune Maharashtra (IN)

(73) Assignee: INVENTIO AG, Hergiswil (CH)

( * ) Notice: Subject to any disclaimer, the term of this patent is extended or adjusted under 35 U.S.C. 154(b) by 860 days.

(21) Appl. No.: 17/904,110

(22) PCT Filed: Feb. 8, 2021

(86) PCT No.: PCT/EP2021/052901

§ 371 (c)(1),
(2) Date: Aug. 12, 2022

(87) PCT Pub. No.: WO2021/165071

PCT Pub. Date: Aug. 26, 2021

(65) Prior Publication Data

US 2023/0109305 A1 Apr. 6, 2023

(30) Foreign Application Priority Data

Feb. 19, 2020 (EP) .................................... 20158246

(51) Int. Cl.
*B66B 3/00* (2006.01)
*B66B 1/36* (2006.01)
*B66B 5/00* (2006.01)

(52) U.S. Cl.
CPC ................ *B66B 3/002* (2013.01); *B66B 1/36* (2013.01); *B66B 5/0087* (2013.01)

(58) Field of Classification Search
CPC ......... B66B 3/002; B66B 1/36; B66B 5/0087; B66B 3/00
(Continued)

(56) References Cited

U.S. PATENT DOCUMENTS

2018/0111792 A1* 4/2018 Schach .................. B66B 1/468

FOREIGN PATENT DOCUMENTS

CN 101941621 A 1/2011
CN 103492300 A 1/2014
(Continued)

OTHER PUBLICATIONS

Ueda et al. (JP H06339144 A), Lobby Interphone Provided With Touch Panel Display Operation Menu Screen (Year: 1994).*
(Continued)

*Primary Examiner* — Jorge L Carrasquillo
(74) *Attorney, Agent, or Firm* — Shumaker, Loop & Kendrick, LLP

(57) ABSTRACT

A notification device and a notification method to announce a current operation mode of an elevator, especially a maintenance or inspection mode, is provided for the elevator that executes the notification method. The elevator includes a control assembly allocated outside of a shaft of the elevator, wherein the notification device is electrically connected or communicates with the control assembly. The notification device includes a display that displays information depending on the status of a lock of the control assembly, wherein the display is off or displays a predetermined first information when the lock is locked, and the display is on and displays a predetermined second information when the lock is unlocked.

19 Claims, 2 Drawing Sheets

(58) Field of Classification Search
USPC .......................................................... 187/388
See application file for complete search history.

(56) References Cited

FOREIGN PATENT DOCUMENTS

| | | | |
|---|---|---|---|
| CN | 107074487 | A | 8/2017 |
| EP | 2497738 | A1 | 9/2012 |
| EP | 3315443 | A1 | 5/2018 |
| JP | 2005067838 | A | 3/2005 |
| JP | 2009215002 | A | 9/2009 |
| JP | 2017100852 | A | 6/2017 |
| JP | 6430590 | B1 | 11/2018 |
| WO | 0044662 | A1 | 8/2000 |
| WO | 2011015895 | A1 | 2/2011 |
| WO | 2011052090 | A1 | 5/2011 |

OTHER PUBLICATIONS

Schroder (WO 0044662 A1)Elevator System With Operating Mode Display (Year: 2000).*
Rebillard Pascal (WO 2011015895 A1), Machineroom-Less Elevator System (Year: 2011).*
Matsuda (JP 2017100852 A), Elevator Inspection System (Year: 2017).*
Sato (JP 2009215002 A)Elevator Control System (Year: 2009).*
Ikedo (JP 2005067838 A) Inspection Work Display System for Elevator (Year: 2005).*

* cited by examiner

1 NOTIFICATION DEVICE
4 DISPLAY
6 TTS-TOOL
11 LANDING OPERATION PANEL
12 SPECIAL BUTTON

NOTIFICATION DEVICE AND METHOD FOR ELEVATOR OPERATION MODE

FIELD

This present invention relates to a notification device and a notification method to announce a current operation mode of an elevator, especially a maintenance or inspection mode, and an elevator that comprises such a notification device or is executed by this notification method.

BACKGROUND

An elevator may comprise an elevator car that is movable vertically in an elevator shaft (hoistway) and may stop at different floors of a building. An elevator control system or a so-called main controller is responsible for coordinating all aspects of elevator service such as travel, speed, and accelerating, decelerating, door opening speed and delay, leveling and hall lantern signals. The control system consists generally of at least a processor, an operating device, a power supply, communication devices, switches, and other electric or electronic components, etc.

At present, more and more elevators don't need machine rooms anymore and can be constructed as machine-room-less (MRL) elevators. Many components including the operation-mode switch of the control system of an elevator are arranged on the top floor next to the landing doors. These components are assembled and locked within a cabinet which can be unlocked using a key for maintenance, repair or emergency purposes, etc. Such a cabinet is only for authorized people accessible. As a lot of important control devices are arranged or installed inside of this control cabinet, a maintenance person has to open the door of the control cabinet before starting maintenance or inspection working and then switch this elevator in a maintenance operation mode. Normally, a key to the cabinet has been assigned to this maintenance person. During a maintenance working of an elevator, passengers may not use this elevator.

Usually, a notification letter will be sent to the resident living in a building in advance to notify them of scheduled maintenance working for an elevator in this building. For an ordinary elevator, before a technician starts maintaining the elevator, he will put up a signboard or stick a label before every shaft door of the elevator in order to notify passengers that this elevator is currently out of service. After working, he has to take the signboards or labels piece to piece away. Sometimes there could be one or several boards or labels left which are forgotten to be removed.

It is known that more and more elevators are provided with destination floor registering apparatus outside of elevator cars in the hall or lobby of a building. Such a destination floor registering apparatus may be provided as an operation panel via which passengers may give their destination floors. In this case, the operation panel is called LOP (lobby or landing operation panel) or Port.

EP2497738 A1 discloses that a landing operation panel (LOP) of an elevator can be switched in a normal notification mode for notifying a user of information relating to an operation of a car and in an inspection-information notification mode for notifying an inspection operator of inspection information corresponding to information for inspecting the elevator.

EP3315443 relates also to a LOP of an elevator, by this LOP multiple different messages or images can be displayed in a predetermined order and changed. For example, a notification to passengers "maintenance is in progress" can be displayed to indicate that the elevator may not be in service.

A disadvantage of this electronic notification is that for example, the displayed information on an LOP is only dependent on the current operation mode of the elevator. To begin a maintenance activity, a maintenance person, e.g. a technician, has to open the door of a control cabinet at first and then turn an operation mode switch in the cabinet to set the elevator into its maintenance operation mode. This means that a notification that an elevator is out of service can be shown only when the elevator has been set into a maintenance operation mode. However, during the maintenance working the technician sometimes needs to switch the elevator temporally in its normal operation mode for testing some functions or procedures. In this case, the LOP will either display that the elevator is available or notify nothing about the not yet finished maintenance working. If a passenger coincidentally uses this elevator in this situation, it could be dangerous for the technician and cause an accident, because he may be still in the elevator shaft or on the roof of the elevator car. On the other hand, the passenger could get frightened, as the moving car may stop abruptly, the light inside of the car may also be shut off. This situation may be unsafe or inconvenient for passengers and should be avoided.

SUMMARY

Therefore, the invention of the present patent application aims to pursue a notification possibility to optimize personnel safety during maintenance working for an elevator and avoid interrupting maintenance working by misusing this elevator by passengers.

Such an object may be achieved by the subject-matter of the exemplary embodiments that are evident from the following description.

An aspect of the present invention relates to a notification device for an elevator that can be provided, wherein the elevator comprises a control assembly allocated outside of a shaft of this elevator, wherein the notification device is able to be electrically connected or communicate with the control assembly. The notification device is provided with a display, and the information displayed is dependent on the status of a lock means of the control assembly, wherein the display is off or displays a predetermined first information when the lock means is locked, and the display is on and displays a predetermined second information when the lock means is unlocked. For this purpose, the notification device and the lock means are connectable electrically or able to communicate with each other. If the status of the lock is changed, the notification device will be set on or off accordingly.

With such a notification device, a technician doesn't need any more to manually notify passengers of information like "Elevator under Maintenance" on every floor. Although if the elevator needs to be switched temporarily in a normal operation mode, but the maintenance working, in fact, is not finished, the notification device will maintain the displayed information notifying that the elevator is currently under maintenance. Consequently, a misusing by passengers during maintenance working can be avoided so that maintenance working can be continued without unexpected interruption.

As an improvement of the present invention, the notification device is wired and/or wirelessly connectable with at least one another notification device. This is the same to say that the notification devices can communicate with each other. The notification devices may located on the same or different floors of a building where the elevator is. For example, the notification device can be integrated into a landing operation panel (LOP) of an elevator. The control assembly of an elevator is normally located on one floor, especially the top floor, of a building. If an elevator comprises more notification devices, it is possible that on every floor or beside every shaft door there is a notification device. Typically, on every floor there will installed at least one notification device. The displayed information on these notification devices is the same or different and can be updated or refreshed asynchronously or asynchronously.

As an improvement of the present invention, the notification device comprises a means to generate an audio or a haptic signal. The audio or the haptic signal is transformed e.g. from the information displayed by the notification device so that a blind person or kids and illiteracies who struggle with reading may also realize that the elevator is currently not available. For example, the notification device may comprise a tool of text-to-speech (TTS) which as a type of assistive technology that may read digital text aloud. TTS can recognize words displayed on a display or sent from other digital devices and convert them into audio signals. When a blind person clicks or touches the display of the notification device, the notification device will generate a voice instruction according to the displayed information.

As a further improvement of the present invention, the lock means is mounted in or on a cover (e.g. a door or a front plate) of the control assembly and can be locked and unlocked by a key means like a key or ID-card, a password and/or a signal sent to the control assembly, for example, the signal is sent from a mobile device or a remote center. Accordingly, the lock means can only be opened by authorized personnel, e.g. a service technician verified by an identity.

Another aspect of the present invention relates to a notification method for an elevator, wherein there is at least one notification device on one or more floors of the building where the elevator installed. The notification device communicates with a control assembly of the elevator allocated outside of a shaft of the elevator, wherein the display displays a predetermined first information or is switched off by locking a lock means of the control assembly, and/or the display is switched on and displays a predetermined second information by unlocking the lock means. Therefore, the information displayed by the notification device will be changed automatically by locking or unlocking a lock means of the control assembly.

As an improvement of the present invention, the second information announces or instructs passengers that the elevator is currently out of service, and/or the first information announces that the elevator is currently available for passengers.

As another improvement of the present invention, the car of the elevator will go to a predetermined destination, when there is nobody in the car and the lock means is unlocked. The predetermined destination is e.g. the floor where the control assembly is settled so that the technician may prove whether anybody is still in the car. If somebody is in the car at the moment of opening the lock means, the driving of the car will not be influenced by unlocking the lock means so that passengers inside of the car will not sense anything being changed. They will be transported to their destination floors without any interference. But in the meanwhile, the notification device is switched to display a notification of the unavailability of the elevator in order to avoid passengers waiting outside of the car try to travel with this elevator. After all passengers inside of the car had left the car and the car stops on the predetermined floor, the technician can set the elevator in the maintenance operation mode.

A further aspect of the present invention relates to an elevator which may consist of one or more aforementioned notification device or be operated by an aforementioned notification method.

At least one of the afore-mentioned implementation examples offers one or more solutions to the problems and disadvantages of the known prior art. Other technological benefits of the present invention become evident to a person skilled in the art from the following description and the claims. The numerous examples of implementing the present invention achieve only a part of the presented advantages. None of the advantages is critical to the examples of implementation. Any required embodiment can technically be combined with any other required embodiment. The examples represent only a few advantageous embodiments and they do not limit the idea of the invention that can be implemented even in other manners within the framework of the claims presented further below.

BRIEF DESCRIPTION OF THE DRAWINGS

Below embodiments of the present invention are described in more detail with reference to the attached drawings. The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
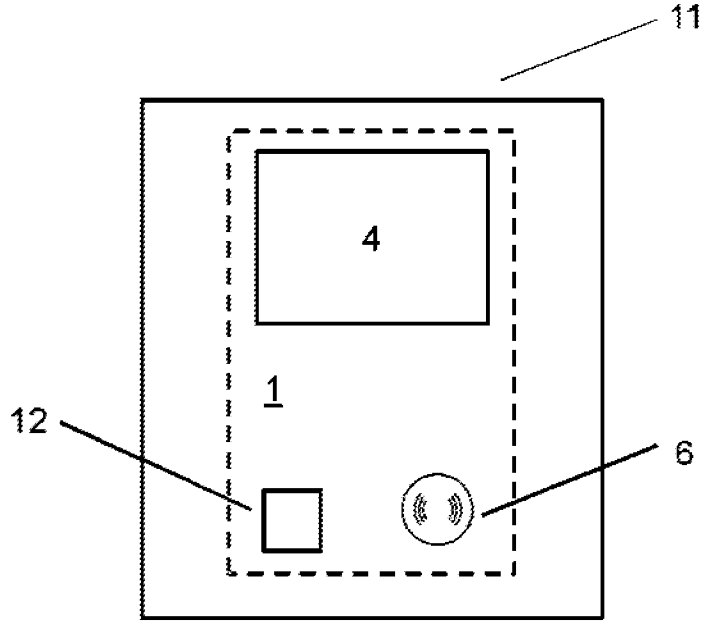
FIG. 1 shows a schematic view of a front side of a notification device according to the aforementioned invention.

FIG. 1 is a schematic view of a front side of one example of a notification device 1 disclosed herein for an elevator. For this embodiment, the notification device 1 comprises a display 4 and is integrated into a landing operation panel (LOP) 11. If the LOP 11 has its own display e.g. like an operation panel using Schindler-Port-technology (Schindler, Ebikon, Switzerland), the display 4 of the control assembly 3 (FIG. 2) and the display of the LOP 11 can be combined in one display unit.

To avoid that a blind person or kids who are not able to read or understand the displayed text information use the elevator 2 (FIG. 2) when the elevator 2 is in its normal operation mode, but maintenance working is not yet finished, the notification device 1 is provided with a TTS-tool 6 for converting the displayed text information in an audio or a haptic signal. From the audio signal, a voice may be generated by a loudspeaker. A haptic signal e.g. can be felt on the display 4 of the notification device 1 if the display 4 is a touchscreen. For example, with a double-click on the display 4 or by pressing a special button 12 of the LOP 11 (normally the button for the disabled) the TTS-tool will start to convert the displayed information into a voice instruction. Such a voice instruction should be helpful for these passengers. For example, the voice is an artificial voice telling a passenger that the elevator is currently and until when out of service.

Figure 2:
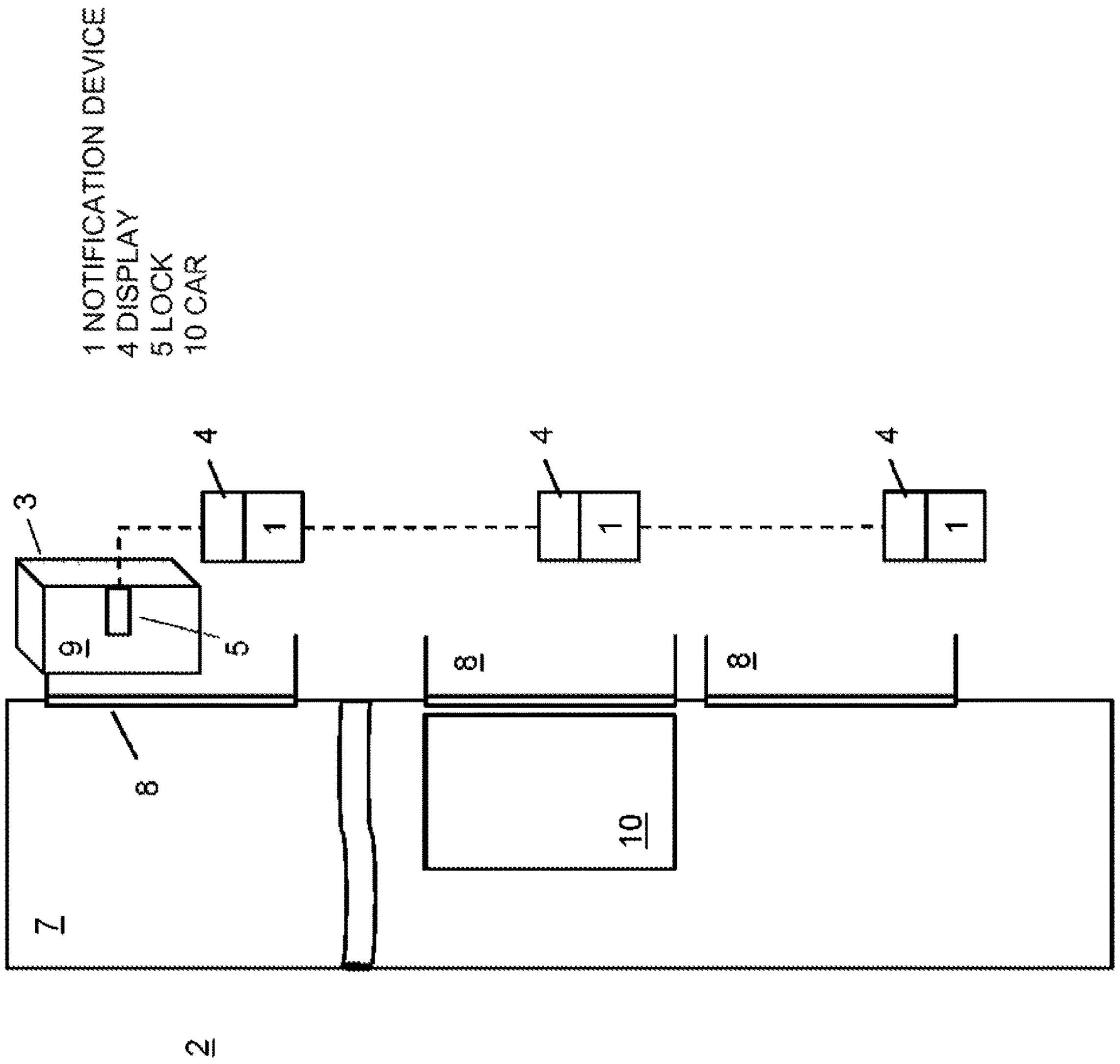
FIG. 2 shows a schematic view of an elevator with a destination arrangement.

As shown in FIG. 2, an elevator 2 is installed in a building, wherein a control assembly 3 of this elevator 2 is allocated outside of the elevator shaft 7 on the top floor 8 of this building. The control assembly 3 is provided as a control cabinet comprising a front door or cover 9 on which a lock means 5 is mounted. The lock means 5 can be locked and unlocked by a key, ID-card, a password and/or a signal sent e.g. from a mobile device to the control assembly 3. The notification device 1 communicates or is electrically connected with the control assembly 3 so that the display 4 may display information in dependence on the current status of the control assembly 3. When the lock means 5 is locked and the control assembly 3 is closed, the display 4 will stay off or be switched off. Alternatively, the display 4 may show the predetermined first information, e.g. advertising information, etc. When the lock means 5 is unlocked and the control assembly 3 has been opened, the display 4 will be on or be switched on and display the predetermined second information to notify passengers that the elevator is now not available for use.

Because a control assembly 3 is settled only on the top floor 8 of this building, it is important that people on other floors 8 should also know whether maintenance working is finished or not. For this reason, there is at least one notification device 1 assigned on every floor 8 of the building. These notification devices 1 are connected wired or wirelessly (dashed lines) with each other, wherein the first notification device 1 on the top floor 8 is coupled directly with the lock means 5 of the control assembly 3. Alternatively, every one of these notification devices 1 can be coupled with the lock means 5 individually and separately. Therefore, the notification devices 1 may display different information. In case that a blind person touches a notification device 1, then just this notification device 1 will generate an audio notification.

It is also possible that on the same floor 8 more than one notification device 1 is assigned, e.g. nearby to the door to a stairway or on the main aisle of the building. Then passengers may recognize earlier that they should take the stairway to their destination floor before they arrive at the unavailable elevator 2. The information displayed by these notification devices 1 can be the same or different and also may be updated or refreshed asynchronously or asynchronously.

When the technician unlocks the lock means 5, the car 10 of the elevator 2 will go to a predetermined destination floor 8 if there is nobody inside of the car 10. The predetermined destination floor is e.g. the top floor of this building. The technician who wants to begin a maintenance working thus may prove whether anybody is still in the car 10. In contrary to this, if a passenger is in the car 10 at the moment of the unlocking the lock means 5, the traveling of this passenger in the car 10 will not be interrupted. But the notification devices 1 will be changed to notify passengers outside of the car 10 of the unavailability or unserviceability of this elevator 2 in order to prevent further using this elevator 2 by other passengers from interrupting maintenance working. For the passenger, who is currently in the car 10, he can be informed that this elevator 2 will be put into maintenance working in a short while, he should leave this car 10 as soon as possible. After the passenger left the car 10 and the car 10 arrived at the top floor 8, the technician will set the elevator 2 in the maintenance operation mode. Then the elevator 2 is only available for the exclusive use of the technician until he finishes the required work.

It is obvious to a person skilled in the art that with the advancement of technology, the basic idea of the invention may be implemented in various ways. The invention and its embodiments are thus not limited to the examples described above; instead, they may vary within the scope of the claims.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A notification device for an elevator, the elevator having a control assembly allocated outside of a shaft of the elevator, the notification device being electrically connected to or in communication with the control assembly, the notification device comprising:

a display displaying information that is dependent on a status of a lock means of the control assembly;

a TTS-tool generating at least one of an audio signal and a haptic signal;

wherein the display is off or displays a predetermined first information when the lock means is locked; and wherein the display is on and displays a predetermined second information when the lock means is unlocked.

2. The notification device according to claim 1 wherein the notification device is at least one of wired to and wirelessly connectable with at least one other of the notification device.

3. The notification device according to claim 2 wherein the notification devices are located on a same floor or different floors of a building where the elevator is installed.

4. The notification device according to claim 2 wherein the displayed information is a same information for each of the notification devices or is different information for each of the notification devices.

5. The notification device according to claim 2 wherein the displayed information for each of the notification devices is displayed synchronously or asynchronously.

6. The notification device according to claim 1 wherein the lock means is mounted on a cover of the control assembly and the lock means is adapted to be locked and unlocked by a key means.

7. The notification device according to claim 6 wherein the key means is at least one of a key, an ID-card, a password and a signal sent to the control assembly.

8. An elevator comprising:

wherein the elevator is installed in a building and has a shaft;

a control assembly of the elevator allocated outside of the shaft; and at least one of the notification device according to claim 1 being located on each floor of the building accessed by the elevator.

9. A notification method for an elevator, wherein there is at least one notification device on one or more floors of a building where the elevator is installed, the notification method comprising the steps of:

the at least one notification device communicating with a control assembly of the elevator, the control assembly being allocated outside of a shaft of the elevator;

wherein the at least one notification device includes a TTS-tool generating at least one of an audio signal and a haptic signal;

displaying a predetermined first information on or switching off a display of the at least one notification device in response to a locking of a lock means of the control assembly communicated to the at least one notification device by the control assembly; and switching on and displaying a predetermined second information on the display in response to an unlocking of the lock means communicated to the at least one notification device by the control assembly.

10. The notification method according to claim 9 wherein the first information announces that the elevator is currently available for passengers.

11. The notification method according to claim 9 wherein the second information announces that the elevator is currently out of service for passengers.

12. The notification method according to claim 9 wherein the at least one notification device is at least one of connected wired to and connected wirelessly with at least one other of the notification device.

13. The notification method according to claim 12 wherein the notification devices display the first and second information synchronously or asynchronously.

14. The notification method according to claim 12 wherein the notification devices display the first information as a same information or as different information.

15. The notification method according to claim 12 wherein the notification devices display the second information as a same information or as different information.

16. The notification method according to claim 9 including generating at least one of an audio signal and a haptic signal by the at least one notification device according to the first and second information displayed on the display.

17. The notification method according to claim 9 including sending a car of the elevator to a predetermined destination when no passenger is in the car and the lock means is unlocked.

18. An elevator comprising:

wherein the elevator is installed in a building and has a shaft;

a control assembly of the elevator allocated outside of the shaft;

at least one notification device being located on each floor of the building accessed by the elevator; and wherein the notification devices execute the notification method according to claim 9.

19. A notification device for an elevator, the elevator having a control assembly allocated outside of a shaft of the elevator, the notification device being electrically connected to or in communication with the control assembly, the notification device comprising:

a display displaying information that is dependent on a status of a lock means of the control assembly;

wherein the lock means is mounted on a cover of the control assembly and the lock means is adapted to be locked and unlocked by a key means;

wherein the display is off or displays a predetermined first information when the lock means is locked; and wherein the display is on and displays a predetermined second information when the lock means is unlocked.

* * * * *